US010693285B2

(12) United States Patent
Jaeker

(10) Patent No.: US 10,693,285 B2
(45) Date of Patent: Jun. 23, 2020

(54) GUIDE DEVICE

(71) Applicant: Igus GmbH, Cologne (DE)

(72) Inventor: Thilo-Alexander Jaeker, Sankt Augustin (DE)

(73) Assignee: IGUS GMBH, Cologne (DE)

( * ) Notice: Subject to any disclaimer, the term of this patent is extended or adjusted under 35 U.S.C. 154(b) by 0 days.

(21) Appl. No.: 15/500,765

(22) PCT Filed: Jul. 1, 2015

(86) PCT No.: PCT/EP2015/065000
§ 371 (c)(1),
(2) Date: Jan. 31, 2017

(87) PCT Pub. No.: WO2016/015942
PCT Pub. Date: Feb. 4, 2016

(65) Prior Publication Data
US 2017/0222412 A1    Aug. 3, 2017

(30) Foreign Application Priority Data

Jul. 31, 2014   (DE) .................... 20 2014 103 562 U

(51) Int. Cl.
*H02G 3/04*  (2006.01)
*H02G 3/06*  (2006.01)
(Continued)

(52) U.S. Cl.
CPC ......... *H02G 3/0437* (2013.01); *H02G 3/0608* (2013.01); *F16G 13/16* (2013.01);
(Continued)

(58) Field of Classification Search
CPC .. H02G 3/0437; H02G 3/0608; H02G 11/006; H02G 3/0418; H02G 3/0431;
(Continued)

(56) References Cited

U.S. PATENT DOCUMENTS 1,770,212 A * 7/1930 Lewis ...................... H02G 3/06
285/19
2,161,492 A * 6/1939 Wadsworth .......... H02G 3/0437
138/160
(Continued)

FOREIGN PATENT DOCUMENTS

CN  201159337  12/2008
CN  101466966  2/2012
(Continued)

OTHER PUBLICATIONS

English translation of International Search Report and Written Opinion from corresponding PCT Appln. No. PCT/EP2015/065000.
(Continued)

*Primary Examiner* — Hiwot E Tefera
*Assistant Examiner* — Taylor L Morris
(74) *Attorney, Agent, or Firm* — Grossman, Tucker, Perreault & Pfleger, PLLC

(57) ABSTRACT

The invention relates to a guide device, in particular for a cable chain, comprising laterally opposite guiding walls for guiding the top part and/or the bottom part of the cable carrier, which are formed from wall elements interconnected from the area of the front-sided end. Said wall elements are made from a single piece of plastic, and they comprise, in the area of the front-sided ends, first securing means made of one piece which enable said elements to be fixed in a positive and/or non-positive fit to a directly adjacent wall element such that a separation therefrom and pivoting counter to is prevented in any direction.

23 Claims, 7 Drawing Sheets

(51) Int. Cl.
  *G02B 6/44* (2006.01)
  *F16L 3/26* (2006.01)
  *F16G 13/16* (2006.01)
  *H02G 11/00* (2006.01)

(52) U.S. Cl.
  CPC .............. *F16L 3/26* (2013.01); *G02B 6/4459* (2013.01); *H02G 3/0418* (2013.01); *H02G 3/0456* (2013.01); *H02G 11/006* (2013.01)

(58) Field of Classification Search
  CPC .... H02G 3/0456; H02G 3/0406; H02G 3/263; H02G 3/06; F16G 13/16; F16L 3/26; G02B 6/4459
  USPC .......................... 174/101, 97, 481, 68.3, 504
  See application file for complete search history.

(56) References Cited

U.S. PATENT DOCUMENTS

| | | | | |
|---|---|---|---|---|
| 2,905,201 | A * | 9/1959 | McNaughton | H02G 3/0437 138/159 |
| 3,022,972 | A * | 2/1962 | Bunston | H02G 3/0608 248/68.1 |
| 3,042,351 | A * | 7/1962 | Du Bois | H02G 3/0437 248/49 |
| 3,338,599 | A * | 8/1967 | Hallman | H02G 3/0608 138/158 |
| 3,370,121 | A * | 2/1968 | Merckle | H02G 3/0608 138/164 |
| 3,680,817 | A * | 8/1972 | Gogan | H02G 3/0437 248/68.1 |
| 3,915,420 | A * | 10/1975 | Norris | H02G 3/0456 248/58 |
| 3,927,698 | A * | 12/1975 | Johannsen | E04F 17/08 138/157 |
| 4,077,434 | A | 3/1978 | Sieckert et al. | |
| 4,080,742 | A * | 3/1978 | Osterried | A63H 19/30 33/561.2 |
| 4,105,051 | A * | 8/1978 | Visentin | E04F 17/04 138/100 |
| 4,156,795 | A | 5/1979 | Lacan | |
| 4,627,469 | A * | 12/1986 | Buard | H02G 3/0425 138/117 |
| 5,257,961 | A | 11/1993 | Wehler et al. | |
| 5,465,929 | A * | 11/1995 | Dooley | H02G 3/0456 248/68.1 |
| 5,602,364 | A * | 2/1997 | Ustin | H02G 3/0418 138/157 |
| 5,663,527 | A * | 9/1997 | Hui | H02G 3/0437 174/101 |
| 5,782,441 | A * | 7/1998 | Shimizu | H02G 3/0608 248/58 |
| 6,107,575 | A * | 8/2000 | Miranda | H02G 3/0437 174/101 |
| 6,118,075 | A * | 9/2000 | Baker | H04Q 1/06 174/100 |
| 6,119,836 | A * | 9/2000 | Blase | H02G 11/006 104/140 |
| 6,216,746 | B1 * | 4/2001 | Guebre-Tsadik | H02G 3/0418 138/155 |
| 6,242,698 | B1 * | 6/2001 | Baker, III | H02B 1/202 174/59 |
| 6,270,258 | B1 * | 8/2001 | Blase | F16G 13/16 191/12 C |
| 6,431,501 | B1 * | 8/2002 | Molek | H02G 3/0456 248/49 |
| 6,459,037 | B2 | 10/2002 | Muller et al. | |
| 6,489,556 | B1 * | 12/2002 | Jauch | A47B 21/06 174/481 |
| 6,494,414 | B2 * | 12/2002 | Benito-Navazo | H02G 3/0418 174/101 |
| 6,603,073 | B2 * | 8/2003 | Ferris | H02G 3/0608 174/481 |
| 6,609,684 | B2 * | 8/2003 | Van Scoy | F16G 13/16 248/49 |
| 6,631,875 | B1 * | 10/2003 | Kampf | H02G 3/0608 138/157 |
| 6,727,434 | B2 * | 4/2004 | Jadaud | H02G 3/0608 174/135 |
| 6,796,409 | B2 * | 9/2004 | Hermey | F16G 13/16 191/12 C |
| 6,852,052 | B2 * | 2/2005 | Jonas | F16G 13/16 474/144 |
| 7,387,046 | B2 | 6/2008 | Ikeda et al. | |
| 7,471,868 | B2 * | 12/2008 | Bayazit | H02G 3/0437 385/136 |
| 7,542,650 | B2 * | 6/2009 | Ellison | G02B 6/4459 248/49 |
| 7,742,675 | B2 * | 6/2010 | Sayres | G02B 6/4459 248/68.1 |
| 7,939,759 | B2 * | 5/2011 | Henry | H02G 3/0431 174/101 |
| 7,939,763 | B2 * | 5/2011 | Jones | H02G 3/0456 174/101 |
| 8,079,186 | B2 * | 12/2011 | Williams | E04B 9/005 52/220.6 |
| 8,193,448 | B2 * | 6/2012 | Syed | G06F 1/18 174/68.1 |
| 8,436,245 | B2 * | 5/2013 | Ayme | H02G 3/0437 174/108 |
| 8,710,369 | B2 * | 4/2014 | Krietzman | H05K 7/18 174/68.3 |
| 8,717,767 | B2 * | 5/2014 | Liang | H05K 7/1491 174/100 |
| 8,950,051 | B2 * | 2/2015 | Kampf | H02G 3/0608 29/428 |
| 9,685,773 | B2 * | 6/2017 | Jaeker | F16G 13/16 |
| 9,866,000 | B2 * | 1/2018 | Mostazo Oviedo | H02G 3/0456 |
| 2001/0022231 | A1 * | 9/2001 | Dyer | H02G 3/0437 174/504 |
| 2004/0003935 | A1 * | 1/2004 | Colmart | H02G 3/0443 174/480 |
| 2004/0124321 | A1 * | 7/2004 | Kampf | H02G 3/0608 248/68.1 |
| 2014/0061415 | A1 | 3/2014 | Hermey | |
| 2015/0322987 | A1 * | 11/2015 | Romano | F16L 3/26 248/49 |
| 2015/0354730 | A1 * | 12/2015 | Plunkett | H02G 3/0462 138/155 |
| 2018/0006440 | A1 * | 1/2018 | Lewinski | H02G 3/0437 |

FOREIGN PATENT DOCUMENTS

| | | |
|---|---|---|
| DE | 2658708 | 7/1977 |
| DE | 4140910 | 2/1993 |
| DE | 29904796 | 7/1999 |
| DE | 19837231 | 2/2000 |
| DE | 10323681 | 12/2004 |
| DE | 202011100313 | 2/2012 |
| DE | 202012003945 | 5/2012 |
| JP | 53-35191 | 4/1978 |
| JP | 2005-315382 | 11/2005 |
| WO | 2005/071284 | 8/2005 |

OTHER PUBLICATIONS

Office Action from related Chinese Appln. No. 201580053200.6 dated Feb. 2, 2018. English translation of the Search Report provided.

Office Action from related Japanese Appln. No. 2017-505507 dated Aug. 14, 2018. English translation of the office action is provided.

* cited by examiner

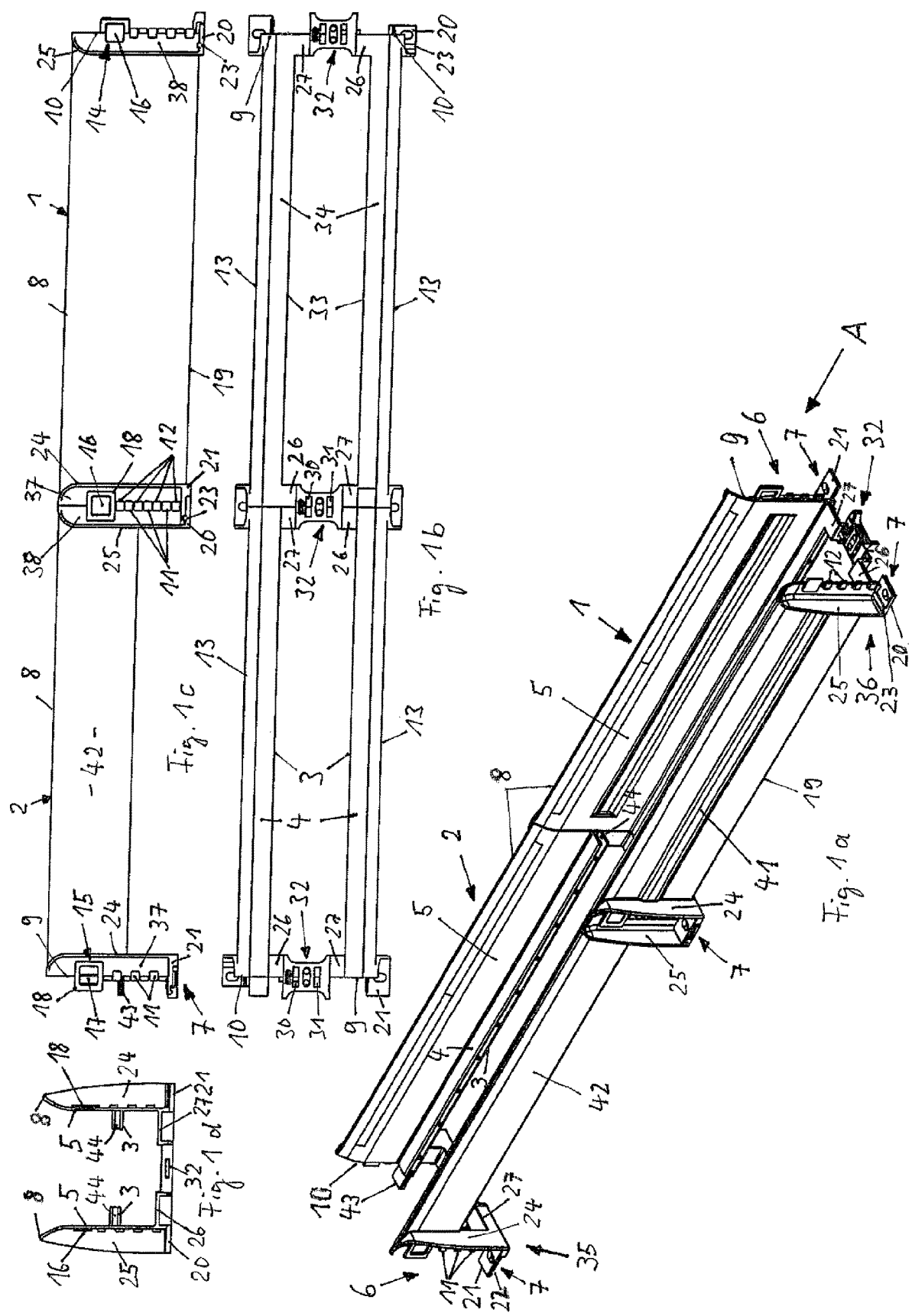

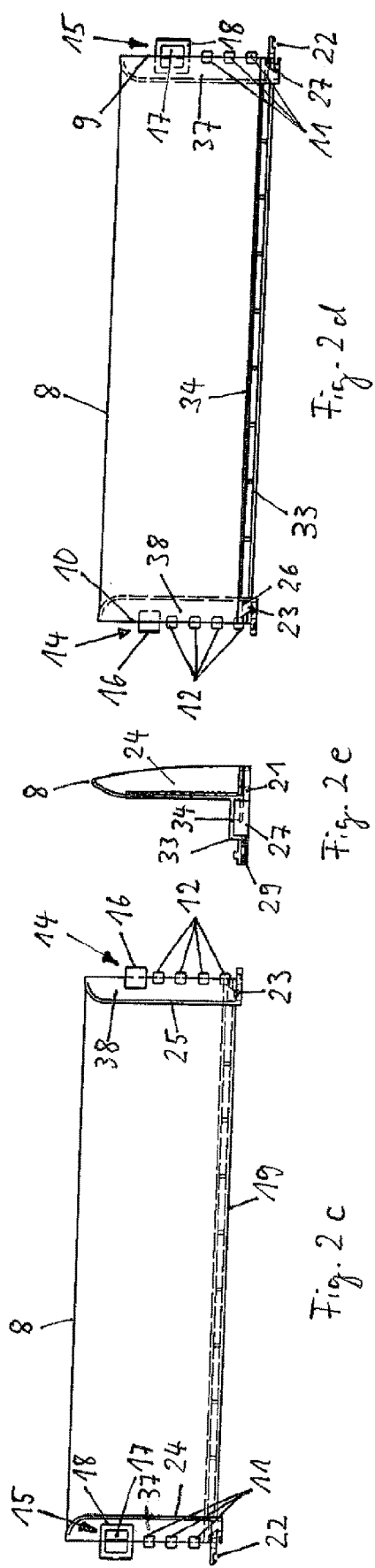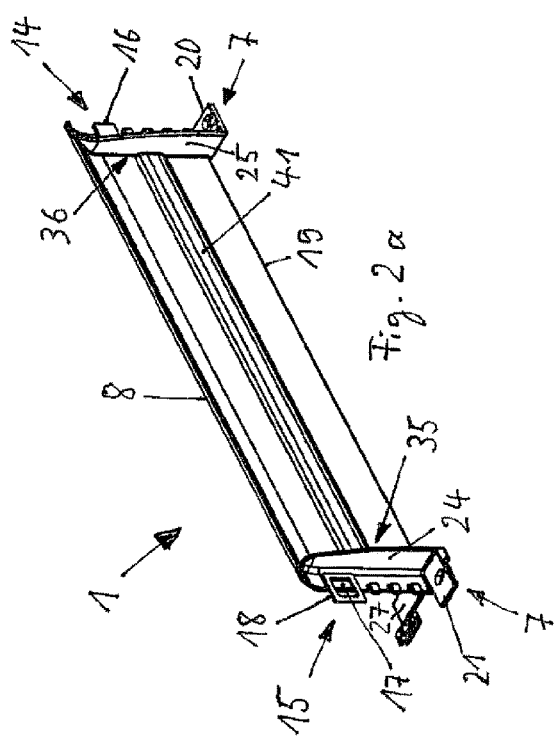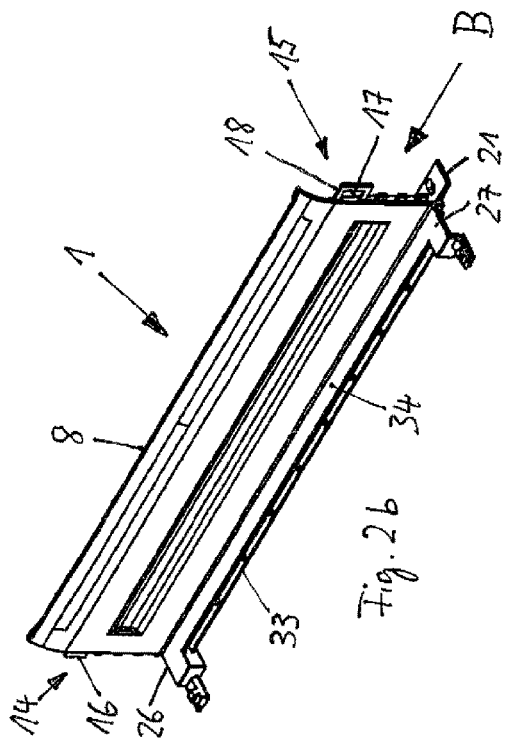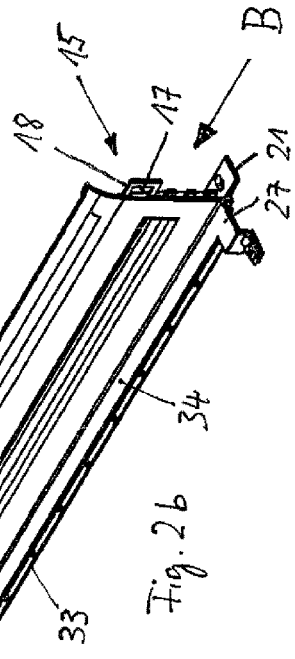

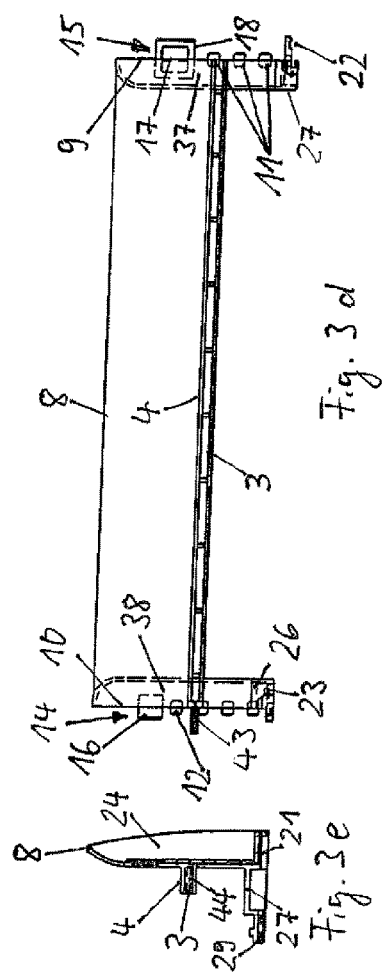
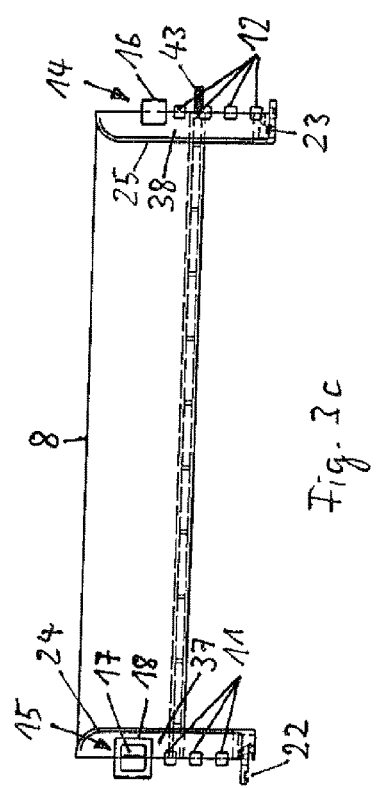
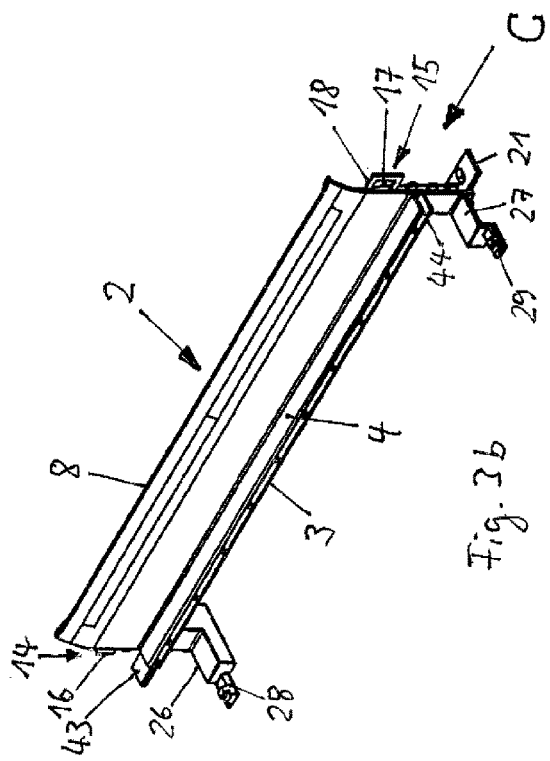
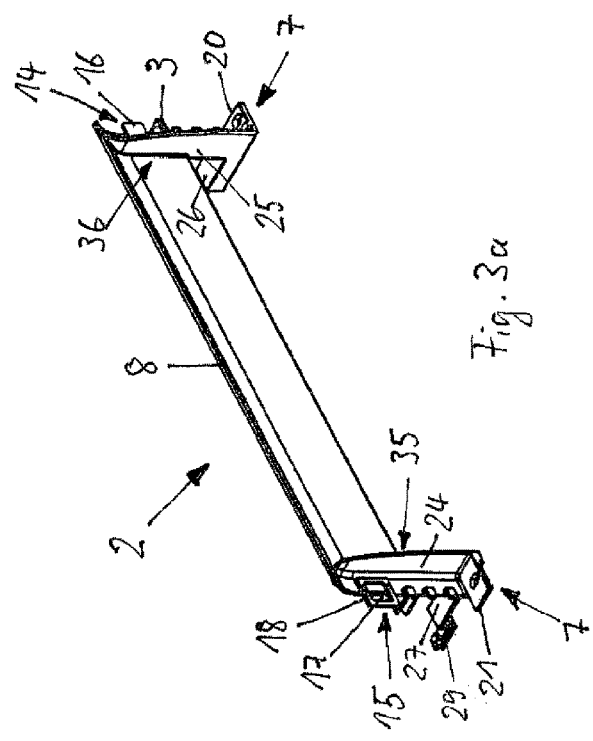

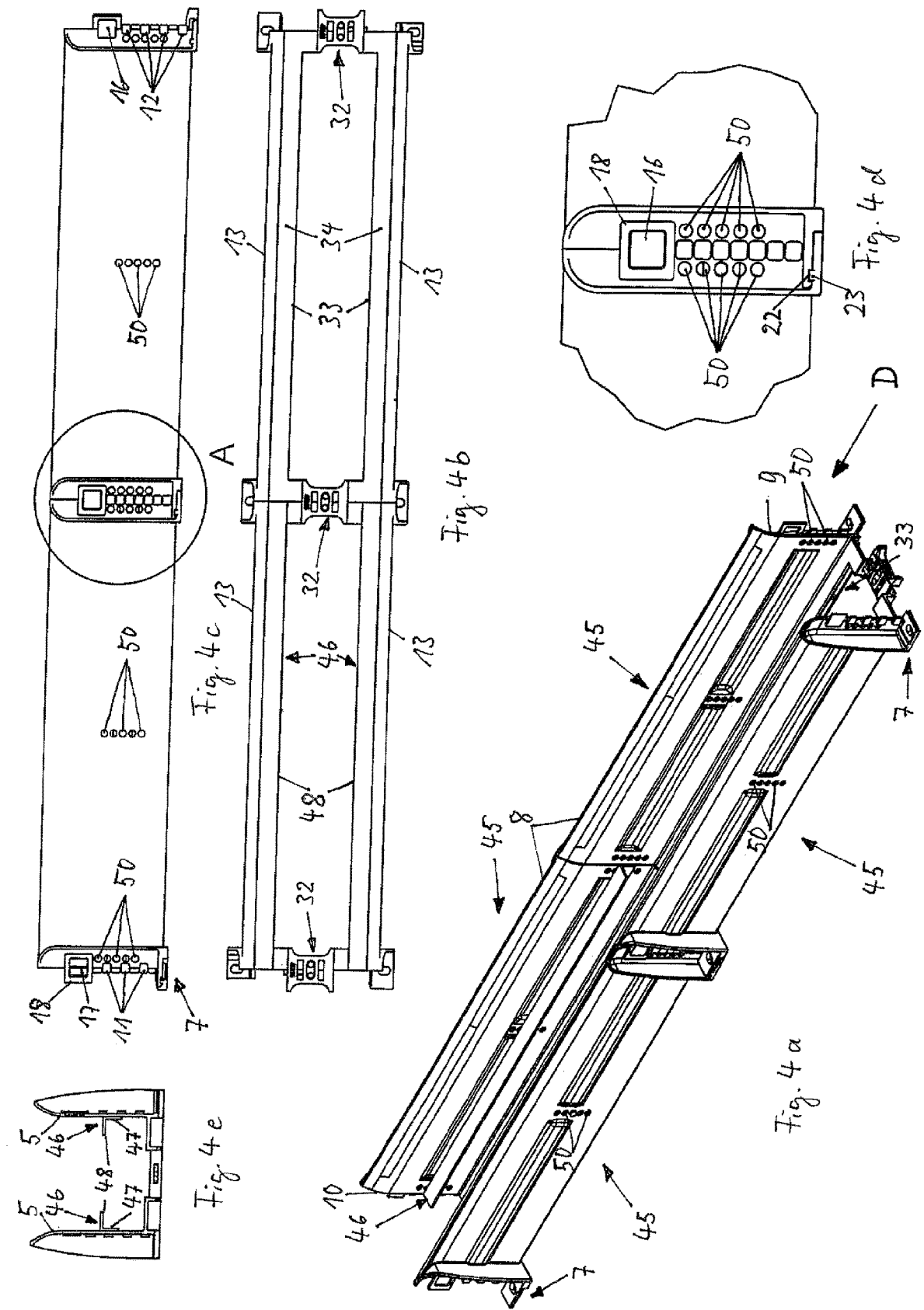

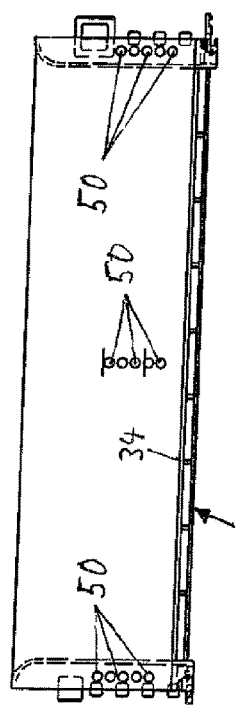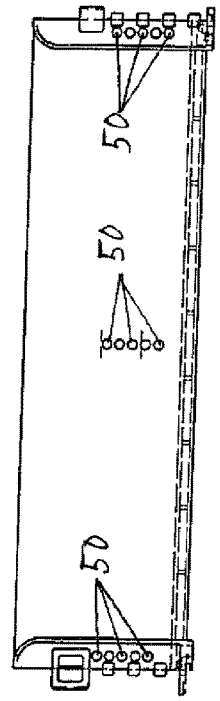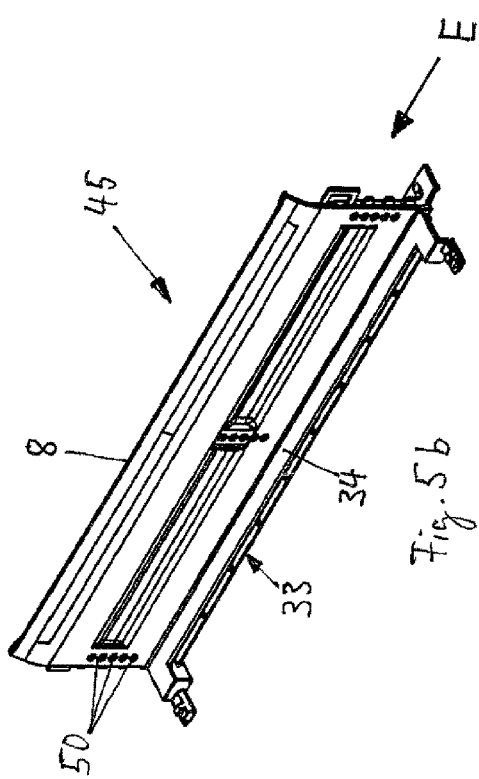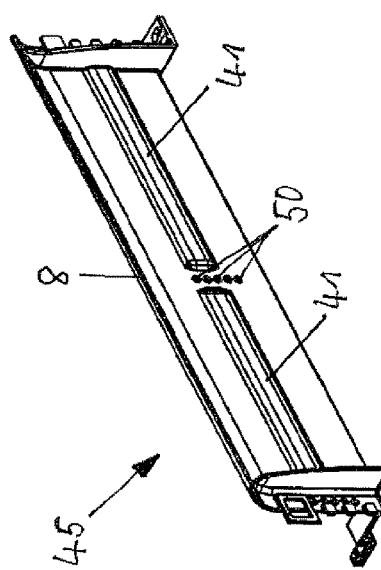

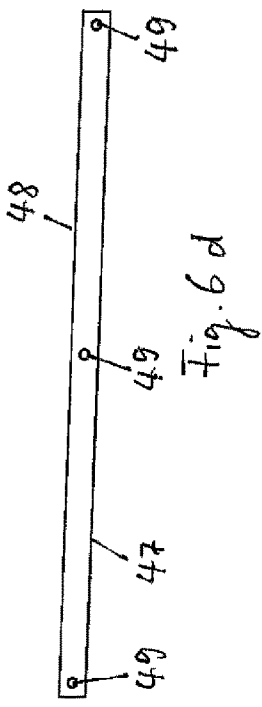
Fig. 6d
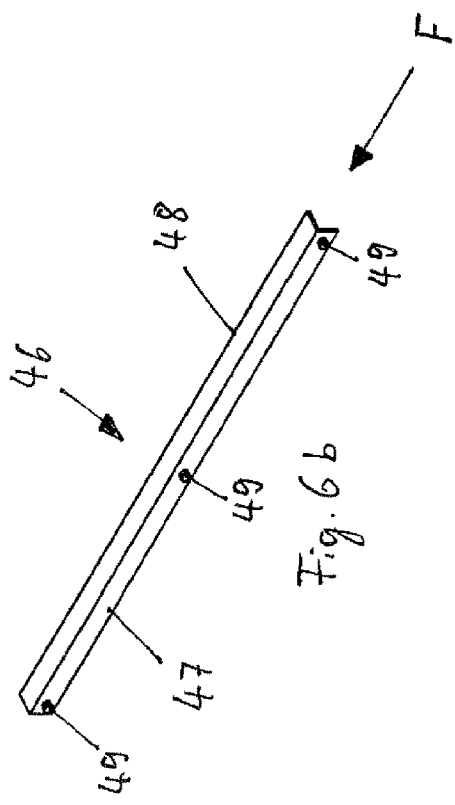
Fig. 6b
Fig. 6e
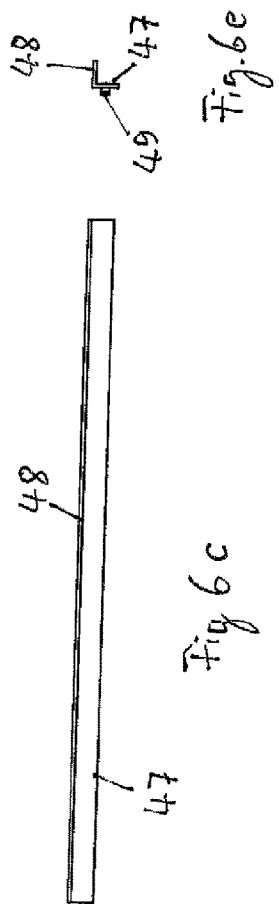
Fig. 6c
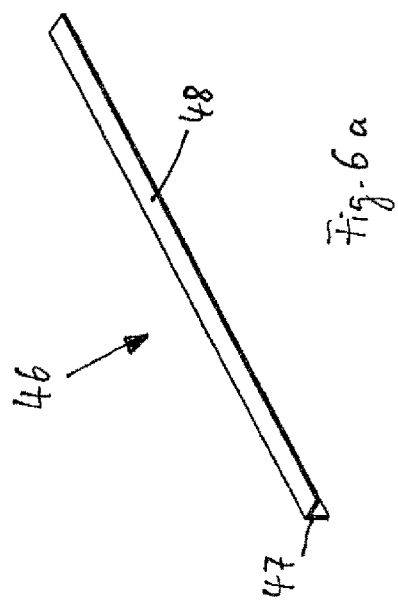
Fig. 6a

GUIDE DEVICE

FIELD OF THE INVENTION

The invention concerns a guide device for a line, in particular an energy guiding chain, which is displaceable in such a way that a portion (upper run) thereof can be positioned over another portion (lower run), and the upper run and the lower run are connected together by an arcuate portion, wherein the guide device has guide walls which are disposed in laterally opposite relationship at least in one region for guiding the upper run and/or the lower run, which comprise laterally mutually opposite wall elements which respectively have two end faces facing away from each other in the longitudinal direction of the wall element, an outside facing away from the laterally opposite wall element, an inside facing towards the laterally opposite wall element, a top side and an underside, wherein the wall elements forming a guide wall are connected together in the region of their front-side ends so that at their insides they form a continuous guide surface extending over the entire guide wall.

SUMMARY

The object of the present invention is to improve such a guide device having guide walls to such an effect that it can be more easily assembled, wherein the wall elements forming the guide walls can be stably connected together.

According to the invention that object is attained by a guide device of the kind set forth in the opening part of this specification, in that the wall elements are formed in one piece from plastic, and have first fixing means formed in one piece thereon in the region of their front-side ends for positively locking and/or force-locking fixing to an immediately adjacent wall element against separation from same and pivotal movement with respect thereto in any direction.

The first fixing means for connecting immediately adjacent wall elements can be adapted in particular in such way that portions of the guide device comprising guide walls having a plurality of wall elements form components which are stable in themselves, without further (separate) fixing means, which components can be securely handled upon transportation and in assembly and which are self-supporting over their entire length.

The wall elements can be for example of a length between 0.5 m and 1 m. Two or three interconnected wall elements which form a stable component are then of a length between 1 m and 3 m.

The first fixing means for connecting adjacent wall elements can further be so designed that only each second or third wall element of a guide wall of the guide device has to be fixed on a base, for example a mounting bracket in a crane installation.

In a preferred embodiment the wall elements have second fixing means formed in one piece thereon for fixing the wall elements on a base or the like.

In particular the wall elements of both guide walls can be of mutually identical configuration.

In addition the wall elements can be of a substantially identical wall thickness over their entire height.

For better insertion of the line, in particular the energy guiding chain, into the guide device, the wall elements are preferably curved outwardly in the region of their top side.

To form the first fixing means, in the region of one of their two ends the wall elements can have at least one projection projecting at the end face in question and in the region of their other end they have an opening which corresponds to the projection and into which the projection of an immediately adjacent wall element can be introduced.

In a preferred development the wall elements can have flat end faces. In that case in the region of their front-side ends at their end face the wall elements have projecting projections which at a front-side end are arranged in height-displaced relationship with respect to the projection or the projections at the other front-side end in such a way that they at least partially cover outside regions of an immediately adjacent wall element and at least one projection engages between two projections without an intermediate space in respect of height.

Preferably the projections are arranged externally on the wall elements so that they at least partially cover the outside of immediately adjacent wall elements.

In an advantageous development the wall elements have mutually corresponding latching means integrally formed thereon in the region of their two front-side ends, which latching means are such that they can entail a latching connection to prevent release of the wall elements from each other in the longitudinal direction thereof with the corresponding latching means of an immediately adjacent wall element.

In a preferred embodiment in the region of one of the front-side ends the latching means is in the form of a projection projecting at the end face in question with a latching region and in the region of the other front-side end the corresponding latching means is provided with an opening into which the latching region of the projection of an immediately adjacent wall element is latchable.

The latching region of the projection can project from the outside of the wall element, wherein the opening corresponding to the latching region is provided in a part projecting from the outside of the wall element.

In a preferred development the opening is of a window-like configuration in the part, the latching region corresponding to the window-like opening.

The latching region and the part having the opening can respectively project by half at the end face in question. In particular, the latching region and the part having the opening, in the connected condition of the immediately adjacent wall elements, can be of a substantially symmetrical configuration with respect to the end faces of the wall elements that bear against each other.

Preferably the second fixing means for fixing the wall elements on a base or the like are in the form of fixing lugs which extend parallel to the underside of the wall elements and which project with respect to the end faces of the wall elements and which overlap upon connection of a wall element to an immediately adjacent wall element.

The fixing lugs can extend outwardly in particular at the outside of the wall elements. Alternatively it can be provided that they extend at the inside of the wall elements in the direction of the respective oppositely disposed wall element.

A tongue-and-groove connection can be provided in the overlap regions of the fixing lugs for providing an additional safeguard against separation of the immediately adjacent wall elements in the longitudinal direction thereof. The groove preferably extends in an end portion, facing away from the end face in question of the wall element, of the one fixing lug transversely relative to the longitudinal direction of the wall element, while the tongue extends in the transverse direction in a corresponding end portion projecting at the other end face of the wall element.

In a preferred configuration there are provided limbs which extend in the region of the front-side ends of the wall elements to the top side thereof and which are formed in one piece at the outsides of the wall elements and which are arranged spaced from the end faces and form an angle with the fixing lugs.

In addition a preferred development of the invention provides that the wall elements have limbs which are directed in the region of their ends towards the oppositely disposed wall element and which can be connected to the limbs of the oppositely disposed wall element.

In particular the limbs can be connected together by the interposition of an intermediate limb. For adaptation to the width of a line to be guided in the guide device, in particular an energy guiding chain, it is possible to provide intermediate limbs of differing lengths, which can be releasably connected to the limbs formed on the wall elements.

The adjacent limbs of two immediately adjacent wall elements can together, preferably bearing against each other, constitute a latching means for connection to an intermediate limb. In that way immediately adjacent wall elements are even more strongly held together.

In addition guide rails can be formed in one piece at the insides of at least one pair of oppositely disposed wall elements for supporting the lower run of a line displaceable in the guide device, in particular an energy guiding chain.

In the case of an arrangement of the line, in particular an energy guiding chain, in which the free end of the lower run has a connection which is stationary with respect to the guide device and the free end of the upper run has a connection which is moveable relative to the guide device, the wall elements with the guide rails formed thereon for the lower run extend from the stationary connection approximately over the maximum length of the lower run upon displacement of the line. In that first portion the upper run can extend for example in self-supporting relationship over the lower run or can be supported on the lower run after a given self-supported length. When longer travel distances are involved support for the upper run outside of the above-mentioned first portion of the guide device, that is to say beyond the stationary connection of the lower run, is provided in a second portion of the guide device. The second portion extends from the stationary connection approximately over the maximum length of the upper run upon displacement of the line, in particular an energy guiding chain.

In that second portion the guide device can have wall elements, at the insides of which guide rails are formed in one piece for the upper run of the line, in particular an energy guiding chain.

The wall region of those wall elements can be interrupted between the first fixing means for connection of immediately adjacent wall elements and optionally second fixing means for fixing the wall elements on a base or the like, beneath the guide rails for the upper run.

The one-piece wall elements of the above-mentioned portions are preferably each identical.

As an alternative to guide rails which are formed in one piece for the upper run, the oppositely disposed wall elements, at their insides, in the above-mentioned second portion of the guide device, can have separate guide rails for the upper run, which can preferably be fixed in positively locking and/or force-locking relationship to the wall elements at differing heights.

The guide rails can be in the form an elongate element which is angular in cross-section, wherein the one leg is intended for fixing to the wall element in question and the second leg extending substantially perpendicularly thereto is intended for supporting the upper run. The leg serving for fixing purposes can have knobs directed towards the wall element in the region of its ends and preferably also in the central region, which engage in positively locking and/or force-locking relationship into openings corresponding to the knobs, in the wall elements.

To permit height adjustment of the separate guide rails for the upper run on the wall elements a plurality of mutually superposed openings can be respectively provided in the wall elements.

Such wall elements with guide rails formed in one piece thereon for the lower run can be used for forming the above-mentioned first and second portions of the guide device, wherein the separate guide rails for the upper run are fixed to the wall elements only in the second portion. In this embodiment all wall elements used for the guide device can be identical.

Preferred embodiments of the present invention are described in greater detail hereinafter with reference to the drawings.

BRIEF DESCRIPTION OF THE DRAWINGS

FIG. 1a shows a perspective view of a portion of a guide device, comprising two respective immediately adjacent wall elements;

FIG. 1b shows a plan view of the portion shown in FIG. 1a;

FIG. 1c shows a lateral view on to the outside of the portion shown in FIG. 1a;

FIG. 1d shows an end view of the portion shown in FIG. 1a in the direction of the arrow A;

FIG. 2a shows a perspective view on to the inside of one of the wall elements shown at the right in FIG. 1a;

FIG. 2b shows a perspective view on to the outside of the wall element;

FIG. 2c shows a side view of the wall element directed on to the outside;

FIG. 2d shows a side view directed on to the inside of the wall element;

FIG. 2e shows an end view of the wall element in the direction of the arrow B in FIG. 2a;

FIG. 3a shows a perspective view on to the outside of one of the wall elements shown at the left in FIG. 1a;

FIG. 3b shows a perspective view on to the inside of the wall element;

FIG. 3c shows a side view on to the outside of the wall element;

FIG. 3d shows a side view on to the inside of the wall element;

FIG. 3e shows an end view of the wall element in the direction of the arrow C in FIG. 3a;

FIG. 4a shows a perspective view of a second embodiment for a portion of a guide device, respectively comprising two wall elements;

FIG. 4b shows a plan view of the portion shown in FIG. 4a;

FIG. 4c shows a side view on to the outside of the portion shown in FIG. 4a;

FIG. 4d shows an enlarged view of the region A in FIG. 4c;

FIG. 4e shows an end view of the portion shown in FIG. 4a in the direction of the arrow D;

FIG. 5a shows a perspective view on to the outside of one of the wall elements shown in FIG. 4a;

FIG. 5b shows a perspective view on to the inside of the wall element;

FIG. 5c shows a side view on to the outside of the wall element;

FIG. 5*d* shows a side view on to the inside of the wall element;

FIG. 5*e* shows an end view of the wall element in the direction of the arrow E in FIG. 5*b*;

FIG. 6*a* shows a perspective view on to the inside of the guide rail shown in FIG. 4*a*;

FIG. 6*b* shows a perspective view on to the outside of the guide rail;

FIG. 6*c* shows a perspective view on to the inside of the guide rail;

FIG. 6*d* shows a side view on to the outside of the guide rail;

FIG. 6*e* shows a perspective view of the guide rail in the direction of the arrow F in FIG. 6*b*;

DETAILED DESCRIPTION

Figure 7D:
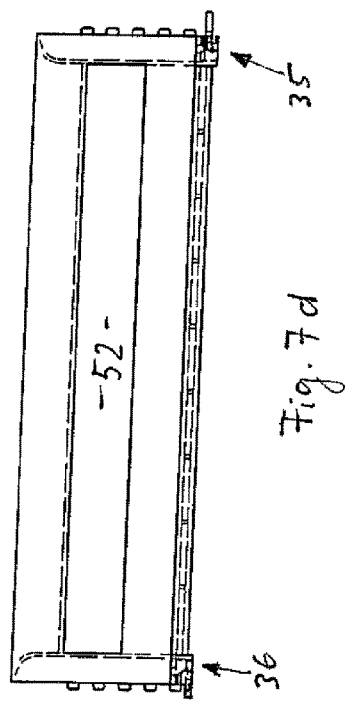
FIG. 7*d* shows a side view on to the inside of the wall element.

FIGS. 1*a* through 1*d* show a portion of a first embodiment of a guide device that includes two mutually opposite guide walls each comprising two wall elements 1, 2. The wall elements 1 shown at bottom right in FIG. 1*a* are adjoined by further wall elements 1 identical thereto and form a first portion of the guide device for supporting the lower run of an energy guiding chain (not shown). Likewise the wall elements 2 shown at top left in FIG. 1*a* are adjoined by further wall elements 2 which are identical thereto and which form a second portion of the guide device for supporting and guiding the upper run of the energy guiding chain. The guide device which can be seen from the view in FIG. 1*a* is so designed that the free end of the lower run of the energy guiding chain to be guided therein has a stationary connection, for example between the wall elements 1 shown in FIG. 1*a*, and the upper run has a connection which is moveable relative to the guide device. The two runs of the energy guiding chain are connected together by an arcuate portion, wherein the arcuate portion of the energy guiding chain moves with a reciprocating movement upon displacement thereof in the above-mentioned portions of the guide device.

In the above-mentioned first portion the upper run depending on the respective length thereof can extend in self-supporting relationship over the lower run or after a given self-supported length can be supported on the lower run. If the upper run extends over the above-mentioned first portion in which it is possibly supported by the lower run into the above-mentioned second portion of the guide device it is there supported and guided by guide rails 3 arranged at the inside of the wall elements 2. The height of the top side 4 of the guide rails 3 at least approximately corresponds to the height of the lower run of the energy guiding chain that is disposed in the first portion.

The wall elements 1, 2 of the first and second portions respectively are identical to each other and injected in one piece from plastic. As can also be seen from FIG. 1*a* the wall elements 1, 2 forming the two oppositely disposed guide walls of the guide device are connected together at their mutually facing end faces in such a way that their insides 5 form a continuous guide surface extending in the longitudinal direction of the wall elements 1, 2 for the upper run and in the above-mentioned first portion for the lower run. In other words, in the region of their mutually facing end faces there are no free spaces between the mutually adjoining insides 5 of the wall elements 1, 2.

The wall elements 1, 2 have first fixing means 6 formed in one piece thereon in the region of their front-side ends for positively locking fixing to an immediately adjacent wall element 1, 2 against separation therefrom and pivotal movement with respect thereto in any direction. The fixing means described hereinafter are so designed that portions of the guide device comprising guide walls having two or three wall elements 1, 2 form components which are stable in themselves, without further separate fixing means, which components can be reliably and safely handled upon transportation and assembly and which are self-supporting over their entire length. The wall elements 1, 2 used in the embodiment are of a length of 0.5 m and in the interconnected condition can form a stable component including two or three wall elements 1, 2.

For a such a component it may be sufficient for only each second or third wall element 1, 2 to be fixed on a base, for example a mounting bracket in a crane installation.

For fixing on a base which can also comprise mounting brackets, the wall elements 1, 2 have second fixing means which are injection-molded in one piece thereon.

The two wall elements 1, 2 from which the above-mentioned first and second portions of the guide device are composed are shown in greater detail in FIGS. 2*a* through 2*e* and FIGS. 3*a* through 3*e* respectively. As can be seen from the Figures the wall elements 1, 2 are of a substantially equal wall thickness over their entire height. For better introduction of the energy guiding chain into the guide device the wall elements 1, 2 are curved outwardly in the region of their top side 8.

The wall elements 1, 2 have flat end faces 9, 10. The first fixing means 6 for connecting immediately adjacent wall elements 1, 2 include projections 11, 12 which project in the region of the two ends of the wall elements 1, 2 at the end faces 9, 10 and at the outside 13 of the wall elements 1, 2. The projections 11 at the end face 9 are arranged in height-displaced relationship with respect to the projections 12 at the end face 10 in such a way that, as shown in FIG. 1*c*, they cover the outside of an immediately adjacent wall element 1, 2 in the region of the front end thereof and engage without the formation of an intermediate space in respect of height between each other. When two immediately adjacent wall elements 1, 2 are joined together the projections 11, 12 provide for exact heightwise alignment of the wall elements 1, 2 with each other and secure the connection between the wall elements 1, 2 to prevent release thereof in a direction transversely relative to their longitudinal direction.

The first fixing means 6 for connecting immediately adjacent wall elements 1, 2 further include mutually corresponding latching means 14, 15 which are injection-molded in one piece on the wall elements 1, 2, in the region of the ends of the wall elements 1, 2. The latching means 14 in the region of the end face 10 is in the form of a projection, projecting at the end face 10 in question, with a latching region 16. The latching means 15 corresponding to that latching means 14 in the region of the other end face 9 is provided with a window-like opening 17 in which the latching region 16 of the projection of an immediately adjacent wall element 1, 2 can be latched. The latching region 16 of the projection projects from the outside 13 of the wall element 1, 2 wherein the window-like opening 17 corresponding to the latching region 16 is provided in a part 18 projecting from the outside of the wall element 1, 2.

The latching region 16 and the part 18 having the window-like opening 17 respectively project by half at the end faces 9 and 10 respectively so that in the connected condition of the immediately adjacent wall elements 1, 2 they are substantially symmetrical with respect to the end faces 9, 10, that bear against each other, of the wall elements 1, 2, as can be seen in particular from FIG. 1c.

The second fixing means 7 for fixing the wall elements 1, 2 on a base are in the form of fixing lugs 20, 21 extending parallel to the underside 19 of the wall elements 1, 2. They project with respect to the end faces 9 and 10 respectively of the wall elements 1, 2 and overlap upon being connected to an immediately adjacent wall element 1, 2, as can be seen in particular from FIGS. 1a and 1c. The fixing lugs extend outwardly at the outside 13 of the wall elements 1, 2.

A tongue-and-groove connection is provided in the overlap regions of the fixing lugs 20, 21 for additionally securing against separation and tilting. The groove 22 extends transversely relative to the longitudinal direction of the wall element 1, 2 in an end portion facing away from the respective end face 9 of the wall element 1, 2, while the tongue 23 extends in the transverse direction in a corresponding end portion projecting at the other end face 10 of the wall element 1, 2.

In addition there are limbs 24, 25 which are formed in one piece at the outsides 13 of the wall elements 1, 2 and extend in the region of the ends of the wall elements 1, 2 to the top side 8 thereof, the limbs being arranged spaced from the end faces 9 and 10 respectively and forming an angle with the fixing lugs 20 and 21.

For fixing the wall elements 1, 2 to their opposite wall elements 1, 2 limbs 26, 27 are produced by injection molding opposite to the fixing lugs 20, 21 at the inside 5 of the wall elements 1, 2, which limbs 26, 27 can be connected to the limbs 27 and 26 respectively of the opposite wall element 1, 2. At their free ends the limbs 26, 27 are provided with a latching means 28, 29 cooperating with a latching means 30 and 31 on an intermediate limb 32 arranged between the limbs 26 and 27 of the opposite wall elements 1, 2. By means of intermediate limbs 32 of differing length, it is possible for the width of the guide device, that is to say the spacing of the insides 5 of the opposite wall elements 1, 2 to be adapted to the width of the energy guiding chain to be guided.

The fixing lugs 20, 21 have openings which are aligned with each other upon overlap of the fixing lugs of immediately adjacent wall elements 1, 2 and serve for fixing screws or bolts to pass therethrough.

When immediately adjacent wall elements 1, 2 are connected, as shown in FIG. 1b, the limbs 26, 27 bear against each other and form a pair of limbs. The latching means 28, 29 of the pair of limbs form a latching means cooperating with the oppositely disposed latching means 30, 31 on an intermediate limb 32 for making a stable fixing connection.

As can be seen in particular from FIGS. 1b, 2b and 2d guide rails 33 are injection-molded in one piece at the insides 3 of the wall elements 1 for supporting the lower run of the energy guiding chain to be fitted therein. The guide rails extend between the limbs 26 and 27 and have therewith a continuous top side 34 at the same level.

The front end regions of the wall elements 1, 2 which include the first fixing means 6 for fixing in positively locking and/or force-locking relationship to an immediately adjacent wall element 1, 2 are referred to hereinafter as fixing regions 35, 36. They can include the second fixing means 7 for fixing the wall element 1, 2 on a base. In the embodiments being considered, the wall regions 37, 38 extending from the limbs 24 and 25 to the end faces 9 and 10 respectively and the fixing lugs 20 and 21 injection-molded in one piece at the underside thereof are included.

The wall regions 39 and 40 of the wall elements 1 extend substantially over the entire height of the fixing regions 35 and 36 as they laterally guide both the lower run and also the upper run of the energy guiding chain to be inserted. Between those guide regions and the fixing regions 35 and 36 the wall elements 1 have outwardly curved bulge portions 41 for increasing the stability of the wall elements 1 in relation to forces acting in the transverse direction on the guide device.

As can be seen from FIGS. 1a, 1c and in particular FIGS. 3a through 3e the wall regions 42 of the wall elements 2 extend between the fixing regions 35 and 36 between the guide rail 3 injected to the inside 5 and the top side 8 arranged at the same height level as in the case of the wall elements 1. The space beneath the wall region 42 between the fixing region 35 and 36 is open.

As can be seen in particular from FIG. 3b through 3d a projection 43 is arranged at an end of the guide rail 3 and a groove 44 corresponding to the projection 43 is arranged at the other end of the guide rail 3. When two immediately adjacent wall elements 2 are fitted together the projection 43 and the groove 44 engage into each other and thereby additionally enhance the stability of the connection.

FIGS. 4a through 4e show a portion of another embodiment of a guide device arranged at the same location as the portion shown in FIGS. 1a through 1d in the guide device. Only the differences in respect of the wall elements 45 used in this embodiment in relation to the above-discussed wall elements 1, 2 are set out hereinafter. In regard to the other details of the wall elements 45, as shown in FIGS. 4a through 4e and 5a through 5e, attention is directed to the above-described first embodiment.

All wall elements 45 of the second embodiment of a guide device are identical and are injected-molded from plastic in one piece. The wall elements 45 correspond to the wall elements 1 of the first embodiment except for a device for arranging a separate guide rail 46 at different heights at the inside 5 of the wall element 45.

As can be seen in particular from FIGS. 6a through 6e the guide rails 46 are in the form of an elongate element which is of an angled cross-section, wherein the one leg 47 is provided for fixing to the wall element 45 in question and the second leg 48 extending substantially perpendicularly thereto is provided for bearing against the upper run. The leg 47 serving for fixing purposes has knobs 49 directed towards the wall element 45 in the region of its ends and in the central region, which engage in positively locking and force-locking relationship into openings 50 in the wall element 45 that correspond to the knobs.

To permit height adjustment of the separate guide rails 46 for the upper run on the wall elements 45 there are provided a respective plurality of mutually superposed openings 50 in the wall elements 45.

Such wall elements 45 which further have guide rails 33 formed in one piece thereon for the lower run are used to form the above-mentioned first and second portions of the guide device, wherein the separate guide rails 46 for the upper run are fixed to the wall elements 45 only in the second portion.

Figure 7B:
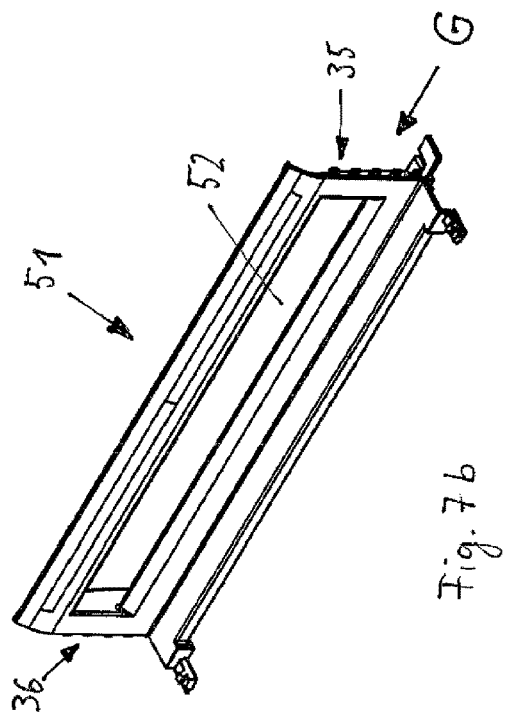
FIG. 7*b* shows a perspective view on to the inside of the wall element.
Figure 7E:
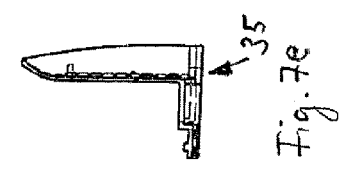
FIG. 7*e* shows an end view of the wall element in the direction of the arrow G in FIG. 7*b*.
Figure 7C:
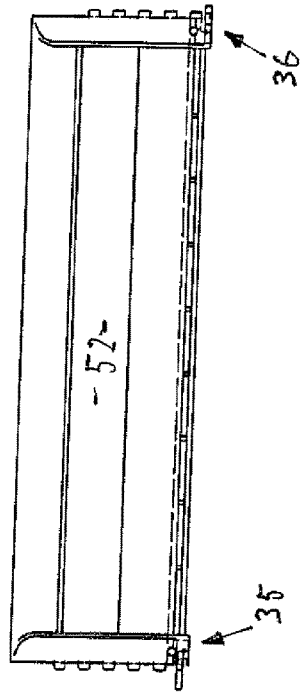
FIG. 7*c* shows a side view on to the outside of the wall element.
Figure 7A:
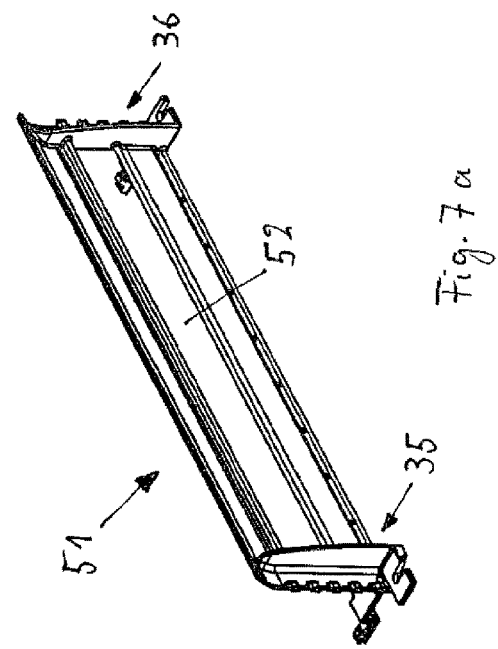
FIG. 7*a* shows a perspective view on to the outside of a further embodiment of a wall element.

In a third embodiment of the guide device wall elements 51 as are shown in FIGS. 7a through 7e are used.

The only difference in relation to the wall element 1 shown in FIGS. 1a through 1b and FIGS. 2a through 2b is that the wall region has a window-like opening 52 between the fixing regions 35 and 36. It extends in respect of its height at a certain spacing from the guide rail 33 which is injected-molded in one piece thereon that is sufficient for lateral guidance of the lower run, approximately as far as the outwardly curved region at the top side of the wall element 51.

Instead of the wall element 1 of the above-described first embodiment the wall element 51 can be used together with wall elements 2 or wall elements 45 of the above-described second embodiment in a guide device. Alternatively the wall elements 51 can be used for forming a guide device, which is in the form of a support channel, for the lower run.

LIST OF REFERENCES 1 wall element
2 wall element
3 guide rail
4 top side
5 inside
6 first fixing means
7 second fixing means
8 top side
9 end face
10 end face
11 projection
12 projection
13 outside
14 latching means
15 latching means
16 latching region
17 opening
18 part
19 underside
20 fixing lug
21 fixing lug
22 groove
23 tongue
24 limb
25 limb
26 limb
27 limb
28 latching means
29 latching means
30 latching means
31 latching means
32 intermediate limb
33 guide rail
34 top side
35 fixing region
36 fixing region
37 wall region
38 wall region
39 wall region
40 wall region
41 bulge portion
42 wall region
43 projection
44 groove
45 wall element
46 guide rail
47 leg
48 leg
49 knobs
50 opening
51 wall element
52 opening

What is claimed is:

1. A guide device for a line, the line having an upper run and a lower run, wherein the line is displaceable such that the upper run is positionable over the lower run, and the upper run and the lower run are connected together by an arcuate portion, wherein the guide device comprises:

an injection molded first longitudinal section and an injection molded second longitudinal section each extending in a longitudinal direction of the guide device, wherein the first longitudinal section and the second longitudinal section are connectable together so as to be arranged in tandem in the longitudinal direction of the guide device and each comprise guide walls, which extend in the longitudinal direction of the guide device, disposed in laterally opposite relationship at least in one region to guide at least one of the upper run and the lower run, wherein the guide walls comprise laterally opposite wall elements, each of the wall elements comprising two end regions, with each of the two end regions of each of the wall elements each comprising an end face facing away from each other in the longitudinal direction of the guide device, wherein each of the wall elements comprise an outside facing away from the laterally opposite wall element, an inside facing towards the laterally opposite wall element, a top side and an underside, wherein each of the two end regions of each of the wall elements each include a first fixing device, wherein each of the wall elements with the first fixing device at each of the two end regions is formed of a single piece of plastic, respectively, wherein, when the first longitudinal section and the second longitudinal section are connected together, the inside of the wall elements of the first longitudinal section and the second longitudinal section form a continuous guide surface from the first longitudinal section to the second longitudinal section, wherein, when the first longitudinal section and the second longitudinal section are connected together, each first fixing device of the first longitudinal section is coupled to a corresponding one of each first fixing device of the second longitudinal section, wherein the wall elements of the first longitudinal section comprise a first plurality of limbs which each extend transverse to the longitudinal direction of the guide device towards the laterally opposite wall element, arranged such that each of the two end regions of each of the wall elements comprises a limb of the first plurality of limbs which are spaced apart by a longitudinal length of the wall element and disposed adjacent one of the end faces of the wall element, respectively, wherein the wall elements of the second longitudinal section comprise a second plurality of limbs which each extend transverse to the longitudinal direction of the guide device towards the laterally opposite wall element, arranged such that each of the two end regions of each of the wall elements comprises a limb of the second plurality of limbs which are spaced apart by a longitudinal length of the wall element and disposed adjacent one of the end faces of the wall element, respectively, wherein, when the first longitudinal section and the second longitudinal section are connected together, each of the limbs of one of the two end regions of each of the wall elements of the first longitudinal section and each of the limbs of one of the two end regions of each of the wall elements of the second longitudinal section are connected to a single intermediate limb of the guide device, wherein the single intermediate limb connects each of the limbs of one of the two end regions of each of the wall elements of the first longitudinal section and each of the limbs of one of the two end regions of each of the wall elements of the second longitudinal section adjacent one another.

2. The guide device as set forth in claim 1, wherein each of the end regions of each of the wall elements of each of the first longitudinal section and the second longitudinal section includes a second fixing device, and
wherein each of the wall elements with the first fixing devices and the second fixing devices is formed of the single piece of plastic, respectively.

3. The guide device as set forth in claim 1, wherein the wall elements of the first longitudinal section are identical, the wall elements of the second longitudinal section are identical, or the wall elements of the first longitudinal section and the second longitudinal section are identical.

4. The guide device as set forth in claim 1, wherein the wall elements of the first longitudinal section are of a substantially identical wall thickness over an entire height, the wall elements of the second longitudinal section are of a substantially identical wall thickness over an entire height, or the wall elements of the first longitudinal section and the second longitudinal section are of a substantially identical wall thickness over an entire height.

5. The guide device as set forth in claim 1, wherein the top side of each of the wall elements of each of the first longitudinal section and the second longitudinal section is curved outwardly.

6. The guide device as set forth in claim 1, wherein at least one first fixing device of one end region of one of the wall elements of the first longitudinal section comprises a projection, and
wherein at least one first fixing device of one end region of one of the wall elements of the second longitudinal section comprises a window opening, and
wherein, when the when the first longitudinal section and the second longitudinal section are connected together, the projection occupies the window opening.

7. The guide device as set forth in claim 1, wherein each end face of each of the end regions of each of the wall elements of each of the first longitudinal section and the second longitudinal section are flat end faces.

8. The guide device as set forth in claim 1, wherein at least one end region of one of the wall elements of the first longitudinal section comprises a plurality of projections, wherein at least one end region of one of the wall elements of the second longitudinal section comprises a plurality of projections, and
wherein, when the first longitudinal section and the second longitudinal section are connected together, the plurality of projections of the first longitudinal section and the plurality of projections of the second longitudinal section engage between one another.

9. The guide device as set forth in claim 8, wherein, when the when the first longitudinal section and the second longitudinal section are connected together, the plurality of projections of the first longitudinal section at least partially cover the outside of at least one of the wall elements of the second longitudinal section and/or vice-versa.

10. The guide device as set forth in claim 1, wherein, when the when the first longitudinal section and the second longitudinal section are connected together, each first fixing device of the first longitudinal section forms a latching connection with a corresponding one of each first fixing device of the second wall longitudinal section.

11. The guide device as set forth in claim 10, wherein at least one of the latching connections is formed by one of the first fixing devices comprising a latching projection and another one of the first fixing devices comprising a latching window opening.

12. The guide device as set forth in claim 10, wherein at least one of the latching connections is formed by one of the first fixing devices which comprises a latching projection which projects from the outside of one of the wall elements and another one of the fixing devices which comprises a latching window opening provided in a part which projects from the outside of another one of the wall elements.

13. The guide device as set forth in claim 10, wherein, at one end of the first longitudinal section, the first fixing device at the end region of a first wall element of the wall elements comprises a latching projection and the first fixing device at the end region of a second wall element of the wall elements comprises a latching window opening,
wherein, at an opposite end of the first longitudinal section, the first fixing device at the end region of the first wall element of the wall elements comprises a latching window opening and the first fixing device of the end region of the second wall element of the wall elements comprises a latching projection.

14. The guide device as set forth in claim 13, wherein, at a connectable end of the second longitudinal section connectable to the first longitudinal section, the first fixing device at the end region of a first wall element of the wall elements corresponding with the first wall element of the first longitudinal section comprises a latching window opening and the first fixing device at the end region of a second wall element of the wall elements corresponding with the second wall element of the first longitudinal section comprises a latching projection.

15. The guide device as set forth in claim 2, wherein each second fixing device at the end regions of each of the wall elements of the first longitudinal section and the second longitudinal section comprises a fixing lug.

16. The guide device as set forth in claim 15, wherein, when the first longitudinal section and the second longitudinal section are connected together, the fixing lugs at the end regions of the first longitudinal section and the fixing lugs at the end regions of the second longitudinal section form overlap regions.

17. The guide device as set forth in claim 16, wherein a tongue-and-groove connection is provided in the overlap regions of the fixing lugs.

18. The guide device as set forth in claim 1, wherein each of the limbs of each of the wall elements of the first longitudinal section and the second longitudinal section are connectable to the intermediate limb by a latching connection to the intermediate limb.

19. The guide device as set forth in claim 1, wherein each wall element of at least one of the first longitudinal section and the second longitudinal section includes a guide rail which extends towards the laterally opposite wall element for supporting the lower run of a line displaceable in the guide device.

20. The guide device as set forth in claim 1, wherein each wall element of at least one of the first longitudinal section and the second longitudinal section includes a guide rail which extends towards the laterally opposite wall element for supporting the upper run of a line displaceable in the guide device.

21. The guide device as set forth in claim 1, wherein separate guide rails are provided at the insides of at least one pair of opposite wall elements for supporting the upper run of a line displaceable in the guide device, in particular an energy guiding chain, which guide rails are fixable at different heights to the wall elements in positively locking and/or force-locking relationship.

22. The guide device as set forth in claim 1, wherein, when the first longitudinal section and the second longitudinal section are connected together, each one of the wall elements of the first longitudinal section is longitudinally adjacent one of the wall elements of the second longitudinal section, respectively.

23. The guide device as set forth in claim 22, wherein, when the first longitudinal section and the second longitudinal section are connected together, the adjacent limbs of the longitudinally adjacent wall elements bear against one another.

* * * * *